United States Patent
Tsai et al.

(10) Patent No.: US 8,041,119 B2
(45) Date of Patent: Oct. 18, 2011

(54) METHOD FOR DETERMINING ORIENTATION OF CHINESE WORDS

(75) Inventors: Wen-Hann Tsai, Taipei (TW); Tzu-Ta Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 1009 days.

(21) Appl. No.: 11/819,215

(22) Filed: Jun. 26, 2007

(65) Prior Publication Data

US 2008/0166047 A1 Jul. 10, 2008

(30) Foreign Application Priority Data

Jan. 5, 2007 (TW) .............................. 96100589 A (51) Int. Cl.
*G06K 9/00* (2006.01)
(52) U.S. Cl. ...................... 382/187; 382/185; 382/186
(58) Field of Classification Search .................. 382/185, 382/186, 187
See application file for complete search history.

(56) References Cited

U.S. PATENT DOCUMENTS

| | | | | |
|---|---|---|---|---|
| 4,730,186 A | * | 3/1988 | Koga et al. ................... | 345/179 |
| 5,111,514 A | * | 5/1992 | Ohta ............................. | 382/177 |
| 5,796,867 A | * | 8/1998 | Chen et al. .................... | 382/187 |
| 6,288,125 B1 | * | 9/2001 | Mendel et al. ................ | 514/646 |
| 6,922,811 B1 | * | 7/2005 | Leung et al. .................. | 715/259 |
| 7,151,860 B1 | * | 12/2006 | Sakai et al. ................... | 382/297 |
| 2006/0045379 A1 | * | 3/2006 | Heaney et al. ................ | 382/276 |
| 2006/0251326 A1 | * | 11/2006 | Yeh et al. ...................... | 382/176 |
| 2008/0166047 A1 | * | 7/2008 | Tsai et al. ..................... | 382/187 |

FOREIGN PATENT DOCUMENTS

| | | |
|---|---|---|
| TW | 206290 | 5/1993 |
| TW | 402711 B | 8/2000 |

* cited by examiner

*Primary Examiner* — Gregory M Desire (74) *Attorney, Agent, or Firm* — Rabin & Berdo, P.C.

(57) ABSTRACT

A method for determining the orientation of Chinese words is provided. The amount of dark pixels in each column of a Chinese word image is calculated. Then, a first point, a second point, and a third point are determined. The first point and the second point correspond to the columns with the largest and the second largest amount of dark pixels, respectively. The third point is located between the first point and the second point. The Chinese word is right-side up if the third point is located on the left side of the Chinese word. The Chinese word is upside down if the third point is located on the right side of the Chinese word.

15 Claims, 7 Drawing Sheets

METHOD FOR DETERMINING ORIENTATION OF CHINESE WORDS

RELATED APPLICATIONS

This application claims priority to Taiwan Application Serial Number 96100589, filed Jan. 5, 2007, which is herein incorporated by reference.

BACKGROUND OF THE INVENTION

1. Field of Invention

The invention relates to a method for determining the orientation of Chinese words and, in particular, to a method for determining the orientation of Chinese words using the projection of the Chinese words in the vertical or horizontal direction.

2. Related Art

Currently, the technique of optical character recognition (OCR) has been widely used for building large-size literature database and making electronic business documents. Using the OCR technique, paper documents can be readily transformed into text images, which are then in turn changed into digital texts. Therefore, a large amount of documents can be transformed into editable text files. This saves a lot of efforts for manually entering the texts.

To use the OCR technique on paper documents, it is usually necessary to scan the documents into image first. Afterwards, the text inside the image is singled out and rearranged by cutting or merging. Finally, the words are compared and recognized.

It is often the case that the user puts the document upside down when scanning an image. As a result, the image received by the word recognition system may not be right-side up. In this case, the word recognition system has to first detect the orientation of the text in the image, for the convenience of subsequent recognition processes.

In comparison with the English system, where only 26 alphabets are involved, determining the orientation of Chinese words is much more complicated. R.O.C. Pat. No. 206,290 discloses a method for determining the orientation of Chinese words. This method is based on the measurement of spacing between words. However, it has to perform the calculation on the words in the entire document before the orientation can be determined.

SUMMARY OF THE INVENTION

An objective of the invention is to provide a method for determining the orientation of a single Chinese word.

Another objective of the invention is to provide a method for determining the orientation of Chinese words without the need to processing the entire document.

In accord with the above-mentioned objectives, the specification discloses a method for determining the orientation of Chinese words. First, a text image with a plurality of pixels is entered. The pixels include several dark pixels and several bright pixels. The dark pixels form a Chinese word. Afterwards, several horizontal coordinates are generated, corresponding to the columns of the text image. Several vertical projections are computed, determining the number of dark pixels corresponding to each horizontal coordinate. Afterwards, a first point and a second point are determined, corresponding to the largest and second largest amounts of vertical projections. A third coordinate is then selected between the first coordinate and the second coordinate. The Chinese word is right-side up if the third point is located on the left side of the Chinese word. The Chinese word is upside down if the third point is located on the right side of the Chinese word.

The method for determining the orientation of Chinese words according to a preferred embodiment of the invention utilizes the pixel projection in the vertical or horizontal direction of the Chinese word to determine the orientation of a single Chinese word.

The method for determining the orientation of Chinese words according to a preferred embodiment of the invention can determine the orientation of Chinese words in a text image. For example, the method determines the total number of right-side up and upside down text images, and compares the total numbers of right-side up text images and upside down text images. The larger one of the two determines the orientation of the Chinese words in the text images.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

The conventional method for determining the orientation of Chinese words has to process words in the entire document in order to determine the orientation. The invention proposes a new method that utilizes the pixel projections in the vertical or horizontal direction to determine the orientation of words. This can determine the orientation of a single Chinese word without processing the entire document.

Observations of the structure of Chinese words tell us that many Chinese words consist of a left part and a right part. The left part is usually the radical of the word. Therefore, a vertical dividing line for a right-side up Chinese word is often slightly to the left of the word. For example, suppose a line is used to divide the Chinese word "証" into "言" and "正". The dividing line is slightly to the left of the word "証". Using this feature in the structure of Chinese words, the method can determine the orientation of a single Chinese word.

Figure 1:
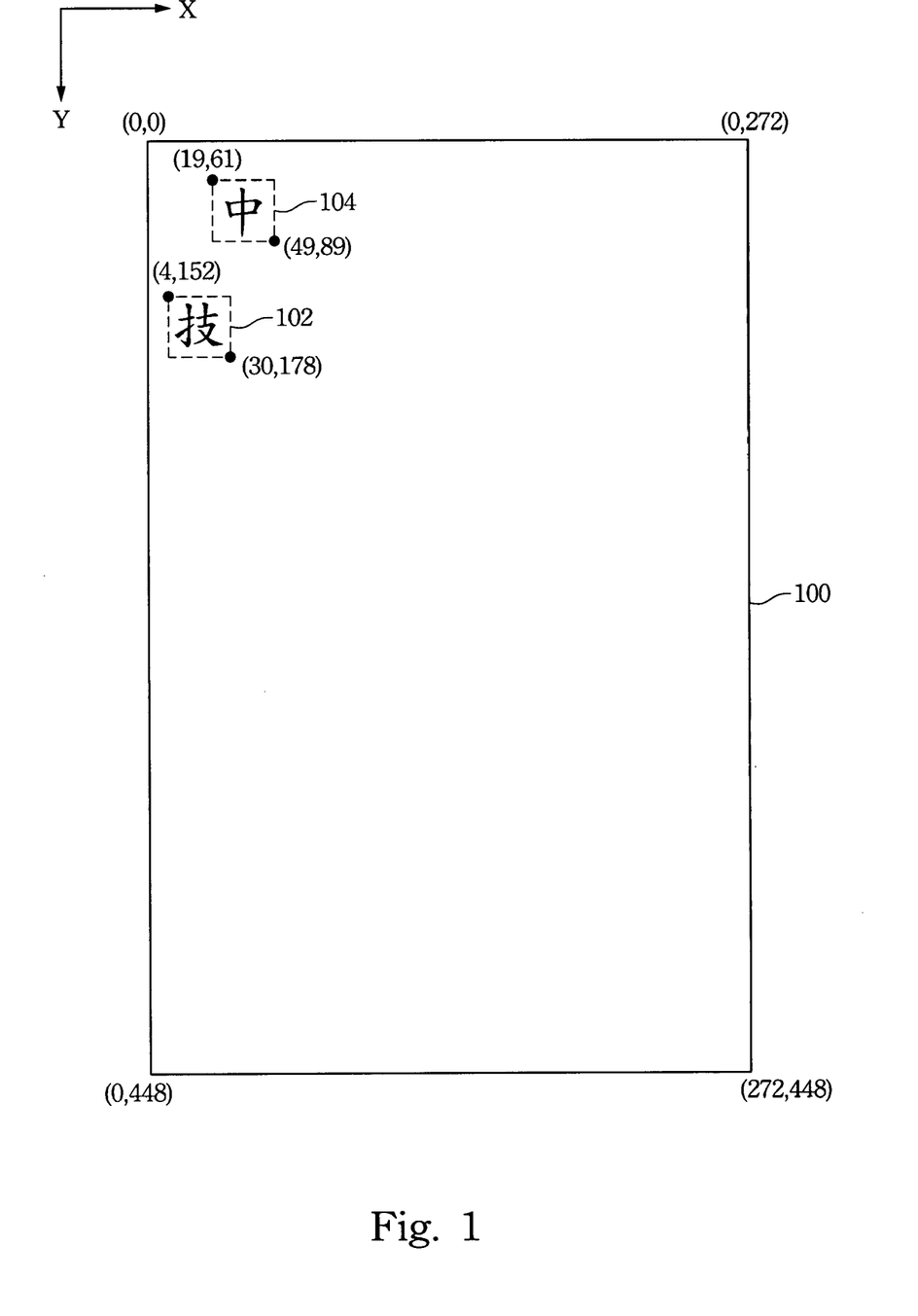
FIG. 1 shows an image to be examined by the disclosed method.

As shown in FIG. 1, the document image 100 may be generated by scanning a paper document containing Chinese words with a scanner. The size of the document image 100 is 272×448 (that is, 272 pixels in width and 448 in height). The document image 100 includes some dark pixels and some bright pixels. It should be mentioned that the document image 100 is an image with black words on a white background. Therefore, the words consist of dark pixels. The disclosed method can analogously applied to the case where words consist of bright pixels (e.g., by first inversing the brightness of the image) or the case where words consist of pixels in grey levels (e.g., by first converting pixels in grey levels into dark pixels). These cases should be included in the invention.

Let's map the document image 100 to a Cartesian coordinate system with perpendicular X-axis and Y-axis. The rectangular region between (4,152) and (30,178) contains a word image "技" 102. The rectangular region between (19,61) and (49,89) contains a word image "中" 104. Table 1 lists the projection and the number of crossings (to be described later) of the dark pixels in the vertical direction for the word image "技" 102 of FIG. 1. It is noted that the vertical projections at the X coordinate of 8 and 21 have the largest value 26 and the second largest value 16, respectively, whereas the vertical projection at the X coordinate of 14 has the smallest value 3.

TABLE 1

| X coordinate | | | | | | | | | |
|---|---|---|---|---|---|---|---|---|---|
| 4 | 5 | 6 | 7 | 8 | 9 | 10 | 11 | 12 | 13 |
| Vertical projection | | | | | | | | | |
| 4 | 6 | 5 | 8 | 26 | 26 | 8 | 5 | 4 | 4 |
| Crossings | | | | | | | | | |
| 3 | 3 | 3 | 3 | 0 | 1 | 3 | 3 | 2 | 2 |

| X coordinate | | | | | | | | | |
|---|---|---|---|---|---|---|---|---|---|
| 14 | 15 | 16 | 17 | 18 | 19 | 20 | 21 | 22 | 23 |
| Vertical projection | | | | | | | | | |
| 3 | 5 | 5 | 6 | 9 | 7 | 9 | 16 | 16 | 10 |
| Crossings | | | | | | | | | |
| 2 | 3 | 3 | 3 | 3 | 4 | 4 | 1 | 2 | 4 |

| X coordinate | | | | | | |
|---|---|---|---|---|---|---|
| 24 | 25 | 26 | 27 | 28 | 29 | 30 |
| Vertical projection | | | | | | |
| 8 | 8 | 11 | 9 | 8 | 5 | 4 |
| Crossings | | | | | | |
| 5 | 4 | 3 | 3 | 3 | 3 | 2 |

Observing the structure of the word "技", one can realize that it consists of a radical "扌" and another part "支". As far as the word image "技" 102 is concerned, the region between the radical "扌" and the part "支" has the smallest vertical projection. Its X coordinate has the value of 14. In other words, the vertical line X=14 can divide the word image "技" 102 into the radical "扌" and the part "支". The vertical line X=14 is located in the left-hand side of the word image "技" 102. Using this feature, the word image "技" 102 is determined to be right-side up.

Figure 2:
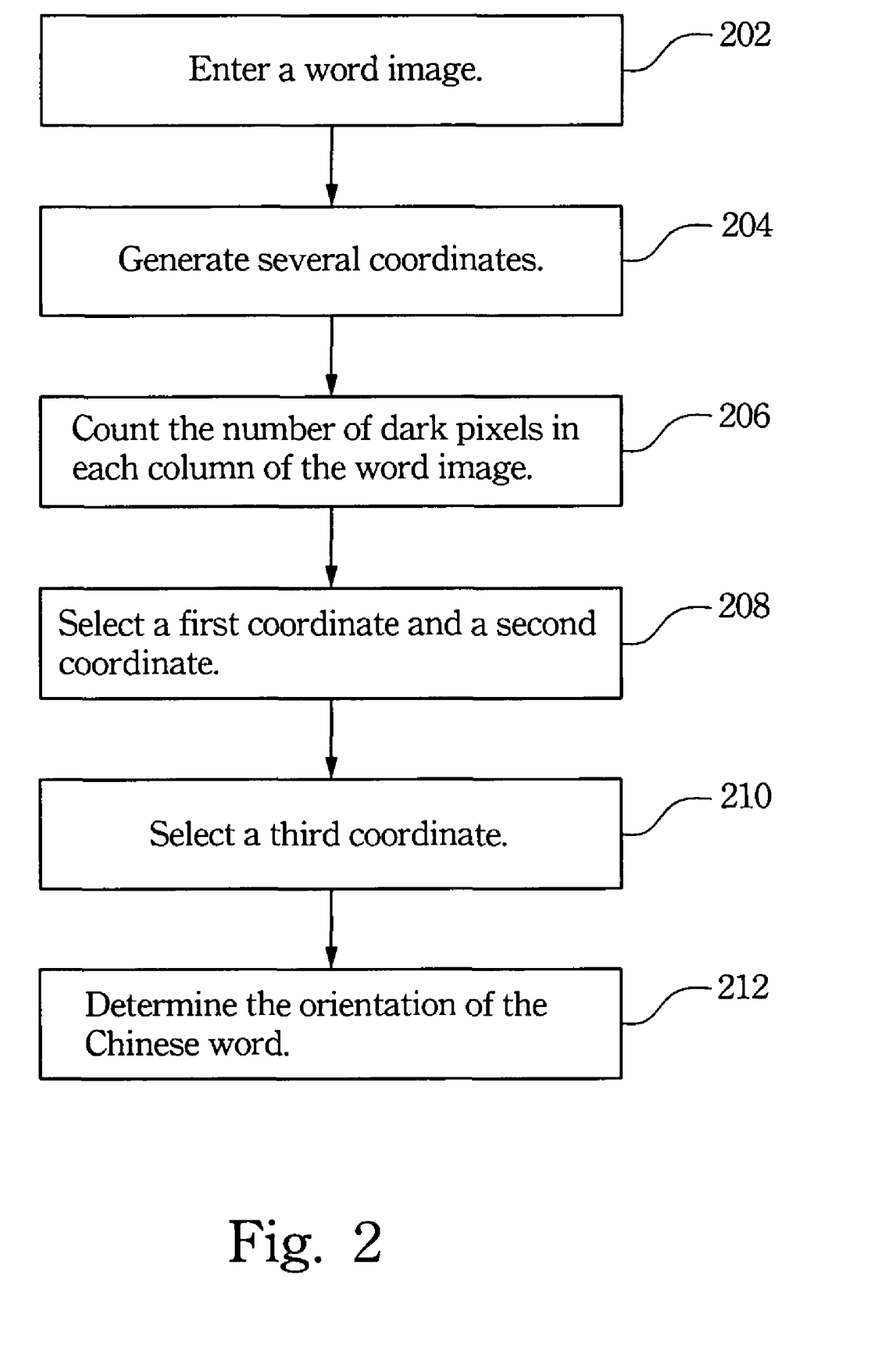
FIG. 2 is a flowchart of the method for determining the orientation of a single Chinese word according to a preferred embodiment of the invention.

FIG. 2 is the flowchart of the disclosed method for determining the orientation of a single Chinese word. First, a word image is entered in step 202. The word image has several pixels, including some dark pixels and some bright pixels. The dark pixels form a Chinese word. For example, a word image "技" in FIG. 1 is entered. In step 204, several coordinates are generated. For example, 27 horizontal coordinates of 4, 5, 6, . . . , 30 are generated, corresponding to the vertical columns of the word image "技" 102. In step 206, several vertical projections are computed. This step computes the number of dark pixels in each column of the word image "技" 102. In other words, this step counts the number of dark pixels for each of the horizontal coordinates of the word image "技" 102. The result is given in Table 1. In step 208, a first coordinate and a second coordinate are selected, corresponding to the largest and second largest values of the dark pixels. For example, the coordinate corresponding to the largest vertical projection in Table 1 is 8 and is the first coordinate. The coordinate corresponding to the second largest vertical projection is 21 and is the second coordinate. In step 210, a third coordinate between the first coordinate and the second coordinate is selected. For example, the third coordinate can be selected to be 14, corresponding to the smallest vertical projection in FIG. 2. In step 212, the orientation of the word image is determined. Explicitly speaking, if the third coordinate is to the left of the word image center, then the word image is right-side up. If the third coordinate is to the right of the word image center, then the word image is upside down. For example, the third coordinate for the word image "技" 102 in FIG. 1 is 14, located to the left of the word image center. Therefore, the word image "技" 102 is determined to be right-side up.

The continuous dark pixels in the image forms a connect component. A single word consists of at least one connect component. The combination of them is called a connect component group. It should be emphasized that a word must be a connect component group, but a connect component group may not be a word. It can be a noise.

Figure 3:
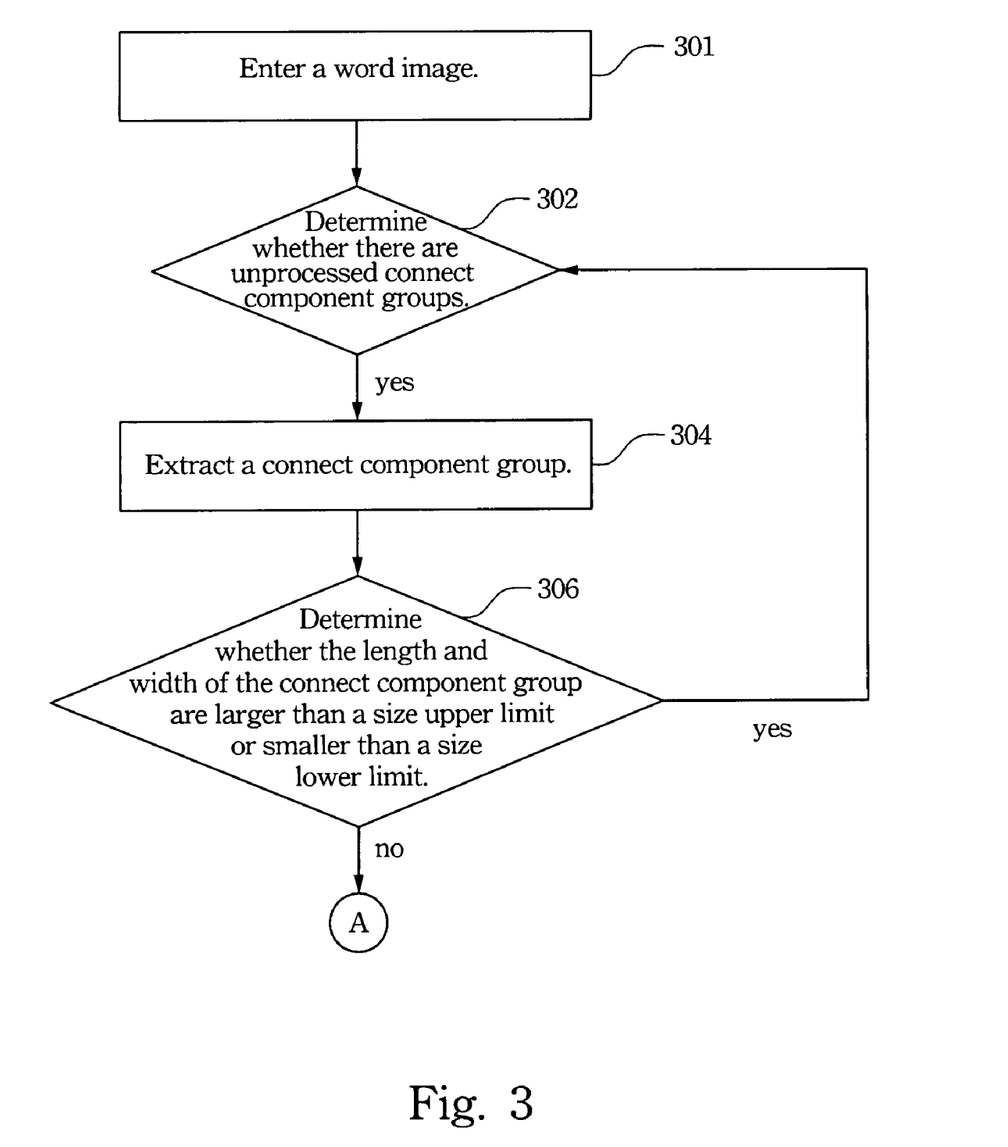
FIG. 3 is a part of the flowchart of the disclosed method for examining a document image.

FIG. 3 is a part of the flowchart of the disclosed method for examining a document image. The document image can include several word images. The method is used to determine the orientation of words in the document image. It examines and counts the words in the document image. If there are more words right-side up, then the document image is determined to be right-side up. If there are more words upside down, then the document image is determined to be upside down.

In step 301, a document image is entered. In step 302, the method determines whether there are any unprocessed connect component groups in the document image. If there are unprocessed connect component groups, then step 304 follows to extract the connect component groups. In step 306, the method determines whether the length and width of the connect component are greater than their upper limit or smaller than their lower limit. For example, we can set 50 pixels as the size upper limit and 20 pixels as the size lower limit. If the size of a connect component group is too large or too small, it is considered as a noise.

Figure 4:
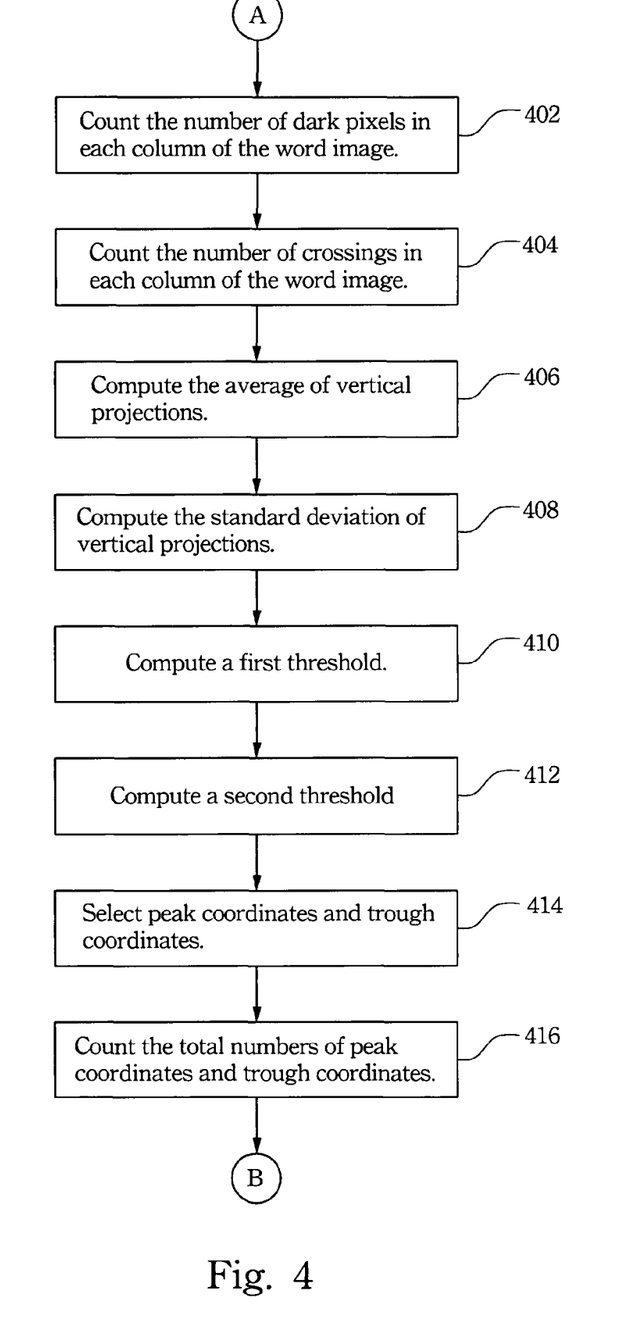
FIG. 4 is another part of the flowchart of the disclosed method for examining a document image.
Figure 6:
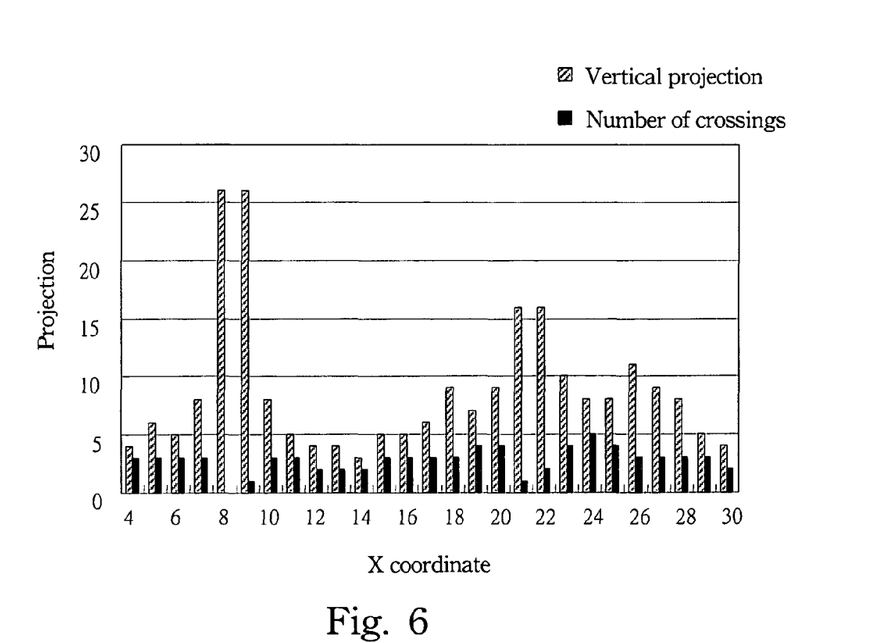
FIG. 6 is a stripe diagram of the vertical projections for the word image "技" in FIG. 1.
Figure 7:
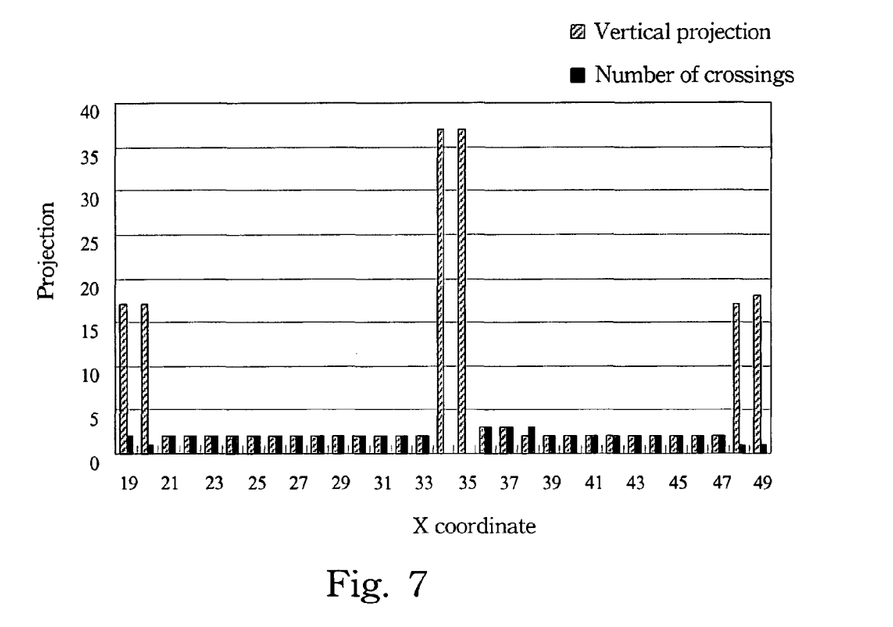
FIG. 7 is a stripe diagram of the vertical projections for the word image "中" in FIG. 1.

FIG. 4 shows another part of the flowchart of the disclosed method for examining a document image. Suppose that in step 304 the extracted connect component group is the word image "技" 102. Following step 306, the method counts the number of dark pixels in each column of the word image "技" 102 in step 402. The result is given as the vertical projections for all the X coordinates in Table 1. In step 404, the method counts the number of crossings in each column of the document image. For example, it counts a specific pixel pattern in each column. The pixel pattern herein can be a bright pixel sandwiched between two dark pixels. More explicitly, the method may count the number of transitions from a dark pixel to a bright pixel and then to a dark pixel again in each column to obtain the number of crossings. For the word image "技" 102 in FIG. 1, the numbers of crossings are also given in Table 1. For the word image "技" 102 and the word image "中" in FIG. 1, the vertical projections and the numbers of crossings are computed and drawn as stripe diagrams in FIGS. 6 and 7.

With further reference to FIG. 4, an average of vertical projections is computed in step 406. For example, using the data given in Table 1, the method computes the average of vertical projections that are greater than 0. In step 408, the standard deviation of vertical projections is computed. For example, using the data given in Table 1, the method computes the standard deviation of vertical projections that are greater than 0. Afterwards, in step 410, a first threshold is defined to be the sum of the average and a first threshold coefficient multiplying the standard deviation. The first threshold is 0.6, for example. In step 412, a second threshold is defined to be the average subtracted by a second threshold coefficient multiplying the standard deviation. The second threshold coefficient is 0.6, for example. Using the data given in Table 1, we obtain the results in Table 2.

TABLE 2

| | |
|---|---|
| Average of vertical projections | 8 |
| Standard deviation of vertical projections | 5 |
| First threshold | 5 |
| Second threshold | 11 |

In step 414, several peak coordinates and several trough coordinates are selected. The peak coordinates refer to those horizontal coordinates whose vertical projections are greater than the first threshold. In contrast, the trough coordinates refer to those horizontal coordinates whose vertical projections are smaller than the second threshold. In step 416, the numbers of peak coordinates and trough coordinates are counted. Using the data given in Table 1 and Table 2, we obtain the results in Table 3.

TABLE 3

| | |
|---|---|
| Peak coordinates | 8, 21 |
| Trough coordinates | 14 |
| Number of peak coordinates | 2 |
| Number of trough coordinates | 1 |

Figure 5:
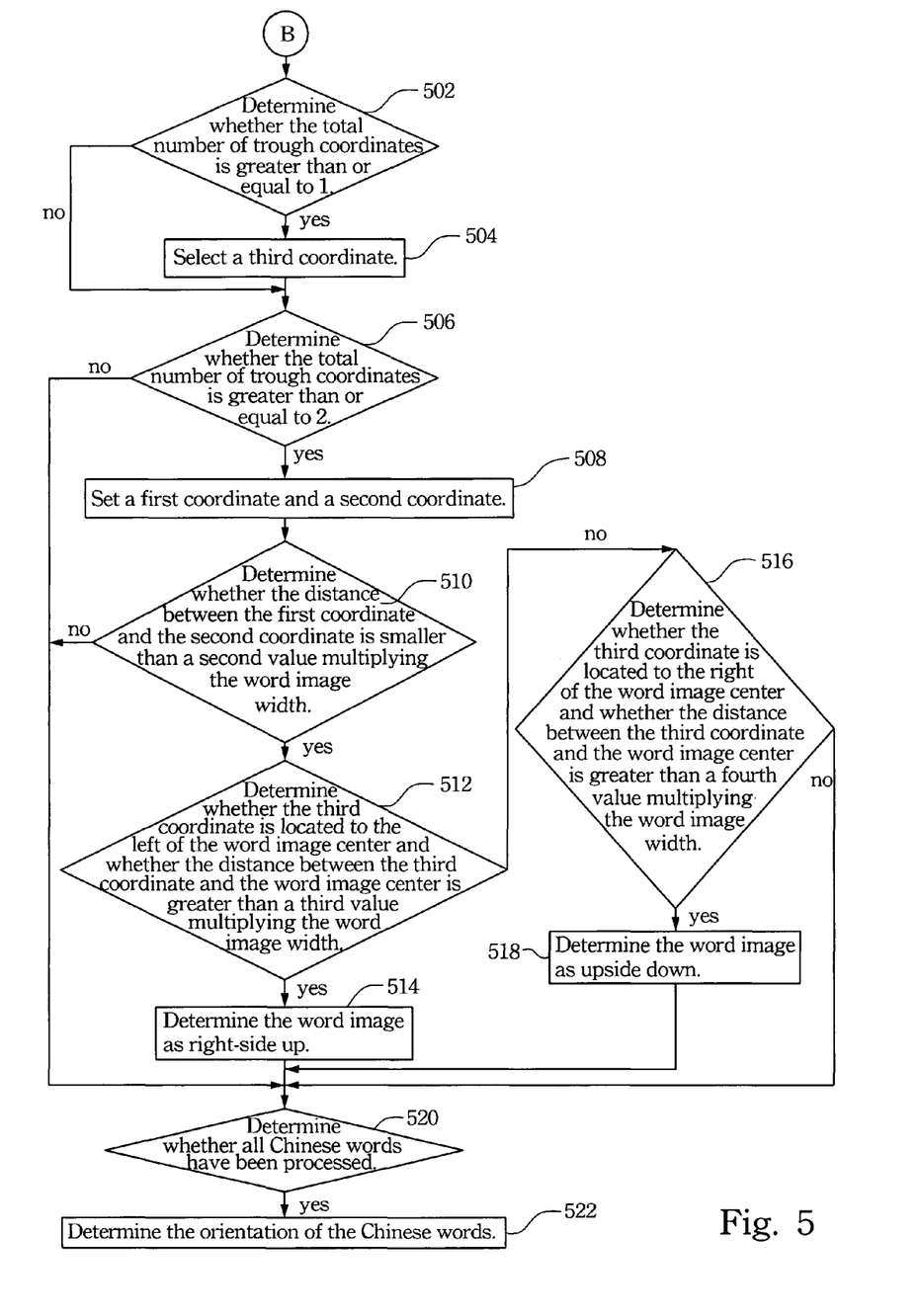
FIG. 5 is yet another part of the flowchart of the disclosed method for examining a document image.

FIG. 5 shows yet another part of the flowchart of the disclosed method for examining a document image. Following step 416, the method determines whether the number of peak coordinates is greater than or equal to 1 in step 502. If yes, a third coordinate between the two coordinates with the largest and second largest vertical projections is selected in step 504. The third coordinate can be a trough coordinate with a number of crossings smaller than a first value and the smallest vertical projection, where the first value is 2 for example. In step 506, the method determines whether the number of peak coordinates is greater than or equal to 2. If yes, the two peak coordinates with the largest and second largest vertical projections are selected in step 508 and set as a first coordinate and a second coordinate.

In step 510, the method determines whether the distance between the first coordinate and the second coordinate is smaller than a second value multiplying the word image width, where the second value is 0.8 for example. If yes, the method determines whether the third coordinate is located to the left of the word image center and the distance between the third coordinate and the word image center is greater than a third value multiplying the word image width in step 512, where the third value is 1/16 for example. If yes, the word image is determined to be right-side up in step 514. If the result in step 512 is no, then the method determines whether the third coordinate is located to the right of the word image center and the distance between the third coordinate and the word image center is greater than a fourth value multiplying the word image width in step 516, where the fourth value is 1/16 for example. If yes, then the word image is determined to be upside down in step 518. Take the word image "技" 102 as an example. Following the above-mentioned steps, we obtain the first, second, and third coordinates as 8, 21, and 14, respectively. The coordinate of the image center is 17. The third coordinate is located to the left of the word image center, and the distance between the third coordinate and the word image center is greater than 1/16 multiplying the word image width. Therefore, the word image "技" 102 is determined to be right-side up.

In step 520, the method determines whether all Chinese words have been processed. If yes, the method then determines the orientation of Chinese words in the document in step 522. For example, the numbers of right-side up and upside down words are counted. When the number of right-side up words is greater than that of upside down words, the document is determined to be right-side up. Otherwise, it is upside down.

Table 4 gives the results for the word image "中" 104. It is noted that no trough coordinate can be found in this case. In other words, there is no vertical line that can divide the word image "中" 104 into a left side and a right side.

TABLE 4

| | |
|---|---|
| Average of vertical projections | 6 |
| Standard deviation of vertical projections | 9 |
| First threshold | 0 |
| Second threshold | 11 |
| Peak coordinates | 19, 34, 49 |
| Trough coordinates | None |
| Number of peak coordinates | 3 |
| Number of trough coordinates | 0 |

Figure 8:
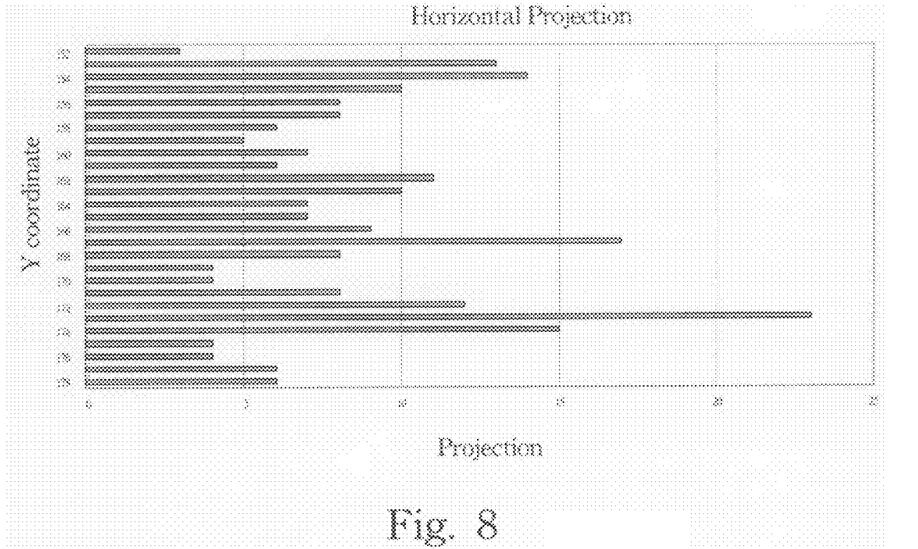
FIG. 8 is a stripe diagram of the horizontal projections for the word image "技" in FIG. 1.
Figure 9:
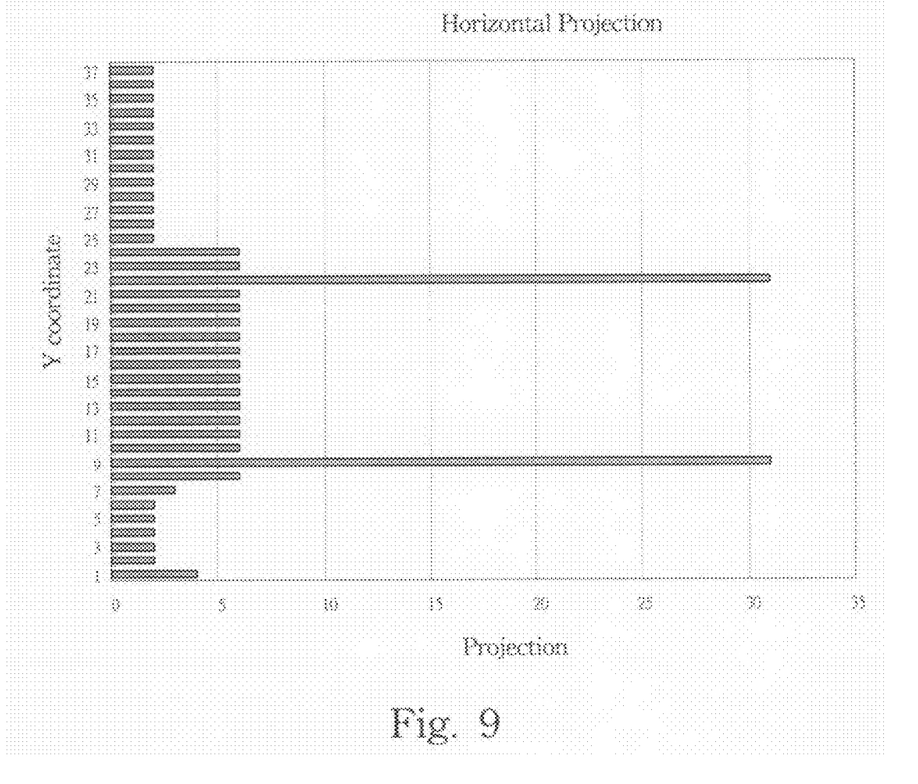
FIG. 9 is a stripe diagram of the horizontal projections for the word image "中" in FIG. 1.

FIGS. 8 and 9 are stripe diagrams of horizontal projections for the word image "技" 102 and the word image "中" 104 in FIG. 1. It is possible that when a user scans a document, the document may be right-side up (0 degree), in a first horizontal direction (90 degrees), upside down (180 degrees), and in a second horizontal direction (270 degrees). Using the horizontal projections of a word image, the disclosed method can determine whether the word image is in the first horizontal direction (90 degrees) or the second horizontal direction (270 degrees). The procedure is similar to that for determining whether the word image is right-side up (0 degree) or upside down (180 degrees). The only difference is that the projections are in the horizontal direction instead of the vertical direction. Therefore, the details are not repeated herein.

Using the above-mentioned method, all the connect component groups in an image can be determined to be right-side up or upside down. The information is collected in order to more precisely determine the orientation of Chinese words inside the image. For example, the total numbers of Chinese words that are right-side up (0 degree), in the first horizontal direction (90 degrees), upside down (180 degrees), and in the second horizontal direction (270 degrees) are counted. Afterwards, the orientation of the Chinese words therein is determined. For example, the orientation with the largest total number of words is the correct orientation of the Chinese words.

It should be mentioned that for some word images there may be no suitable vertical lines to divide them into left and right parts. For example, if the results are no in steps 502, 510, and 516, the word being examined cannot be suitably divided. The method can skip the determination of the orientations of such words and continue with the rest. Generally speaking, the disclosed method can reach an accuracy of 73% for a document with 25 Chinese words. If the number of words is 200, the accuracy can be as high as 99%.

According to the above-mentioned embodiment, the invention uses the vertical or horizontal pixel projections of a Chinese word to determine its orientation. This can be done without processing the entire document.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for determining the orientation of Chinese words, the method comprising the steps of:
   (a) scanning, using a scanner, a paper document containing a Chinese word to generate a word image, the word image having a plurality of pixels, including a plurality of dark pixels forming the Chinese word and a plurality of bright pixels;
   (b) generating, by a processor, a plurality of horizontal coordinates corresponding to a plurality of vertical lines of the word image;
   (c) counting, by the processor, a plurality of vertical projections, each of which is the number of dark pixels on the vertical line associated with each of the horizontal coordinates;
   (d) selecting, by the processor, a first coordinate and a second coordinate, corresponding to the largest and second largest vertical projections, respectively;
   (e) selecting, by the processor, a third coordinate between the first coordinate and the second coordinate; and
   (f) determining, by the processor, the orientation of the Chinese word as right-side up if the third coordinate is located to the left of a center of the word image and as upside down if the third coordinate is located to the right of the center of the word image.

2. The method of claim 1 further comprising the step of counting a plurality of numbers of crossing by counting the number of a specific pixel pattern for each of the horizontal coordinates.

3. The method of claim 2, wherein the pixel pattern is a bright pixel between two dark pixels.

4. The method of claim 2, wherein the number of crossings for the third coordinate is not greater than a first value.

5. The method of claim 1 further comprising the step of determining whether the distance between the first coordinate and the second coordinate is greater than a second value multiplying the width of the word image and finishing the procedure if the determination result is no.

6. The method of claim 1 further comprising the step of determining whether the third coordinate is located to the left of the word image center and whether the distance between the third coordinate and the word image center is greater than a third value multiplying the word image width and the step of determining the word image as right-side up if the determination result is yes.

7. The method of claim 1 further comprising the step of determining whether the third coordinate is located to the right of the word image center and whether the distance between the third coordinate and the word image center is greater than a fourth value multiplying the word image width and the step of determining the word image as upside down if the determination result is yes.

8. The method of claim 1, wherein step (d) includes the steps of:
   computing an average and a standard deviation by computing the average and the standard deviation of those vertical projections being greater than 0, respectively;
   computing a first threshold being the sum of the average and a first threshold coefficient multiplying the standard deviation;
   selecting a plurality of peak coordinates, the vertical projections of which are greater than the first threshold; and
   selecting the first coordinate and the second coordinate from the peak coordinates.

9. The method of claim 8 further comprising the step of counting the number of the peak coordinates.

10. The method of claim 9 further comprising the step of determining whether the number of the peak coordinates is greater than or equal to 2.

11. The method of claim 1, wherein step (e) includes the steps of:
    computing an average and a standard deviation by computing the average and the standard deviation of those vertical projections being greater than 0, respectively;
    computing a second threshold being the average subtracted by a second threshold coefficient multiplying the standard deviation;
    selecting at least one trough coordinate, the vertical projection of which is smaller than the second threshold; and
    selecting the third coordinate from the trough coordinates.

12. The method of claim 11 further comprising the step of counting the number of the trough coordinates.

13. The method of claim 12 further comprising the step of determining whether the number of the trough coordinates is greater than or equal to 1.

14. The method of claim 1 further comprising the steps of:
    repeating steps (a) through (f) for determining the orientations of a plurality of word images in a document image;
    counting the total numbers of the word images that are right-side up and upside down, respectively; and
    determining the orientation of the Chinese words in the document image according to the orientation of those Chinese words with the larger total number.

15. The method of claim 1, wherein the scanner is a part of an optical character recognition device.

* * * * *